US012426078B2

(12) United States Patent
Yue et al.

(10) Patent No.: US 12,426,078 B2
(45) Date of Patent: Sep. 23, 2025

(54) METHOD AND APPARATUS FOR SMALL DATA TRANSMISSION

(71) Applicant: LENOVO (BEIJING) LIMITED, Beijing (CN)

(72) Inventors: Ran Yue, Haidian District (CN); Jie Shi, Haidian District (CN); Jing Han, Chaoyang District (CN); Lianhai Wu, Chaoyang (CN); Haiming Wang, Xicheng District (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 364 days.

(21) Appl. No.: 18/001,742

(22) PCT Filed: Jun. 19, 2020

(86) PCT No.: PCT/CN2020/097218
§ 371 (c)(1),
(2) Date: Dec. 14, 2022

(87) PCT Pub. No.: WO2021/253438
PCT Pub. Date: Dec. 23, 2021

(65) Prior Publication Data
US 2023/0232442 A1 Jul. 20, 2023

(51) Int. Cl.
*H04W 76/27* (2018.01)
*H04W 52/02* (2009.01)
(Continued)

(52) U.S. Cl.
CPC ..... *H04W 72/563* (2023.01); *H04W 72/1268* (2013.01)

(58) Field of Classification Search
CPC ..... H04W 72/21; H04W 72/23; H04W 72/56; H04W 80/02; H04W 76/27;
(Continued)

(56) References Cited

U.S. PATENT DOCUMENTS

2012/0127959 A1   5/2012   Digirolamo et al.
2013/0301541 A1*  11/2013  Mukherjee ........ H04W 74/0833
                                                    370/329
(Continued)

FOREIGN PATENT DOCUMENTS

CN   103391609 A   11/2013
CN   104769022 A    7/2015
(Continued)

OTHER PUBLICATIONS

PCT/CN2020/097218, "International Preliminary Report on Patentability", PCT Application No. PCT/CN2020/097218, Dec. 29, 2022, 5 pages.
(Continued)

*Primary Examiner* — Sai Aung
(74) *Attorney, Agent, or Firm* — FIG. 1 Patents (57) ABSTRACT

Embodiments of the present application relate to a method and an apparatus for or small data transmission of a user equipment (UE) in an RRC_IDLE state or an RRC_INACTIVE state. According to an embodiment of the present application, a method can include: a method may include maintaining a priority variable for each logical channel of at least one logical channel; determining a value of the priority variable for each logical channel after performing a first logical channel prioritization (LCP) procedure; receiving a message indicating a MAC reset; and after receiving the message, in a second LCP procedure subsequent to the first LCP procedure, using the value as an initial value of the priority variable for each logical channel of the at least one logical channel. Embodiments of the present application can satisfy the QoS requirement and fairness for the traffics transmitted in the logical channels in NR systems.

20 Claims, 5 Drawing Sheets

(51) Int. Cl.
*H04W 72/12* (2023.01)
*H04W 72/1268* (2023.01)
*H04W 72/563* (2023.01)

(58) Field of Classification Search
CPC ............. H04W 74/0833; H04W 72/04; H04W 72/0446; H04W 72/0453; H04W 72/20; H04W 74/0838; H04W 74/004; H04W 74/006

See application file for complete search history.

(56) References Cited

U.S. PATENT DOCUMENTS

| | | | |
|---|---|---|---|
| 2017/0285177 A1* | 10/2017 | Jin | G01S 19/42 |
| 2018/0270894 A1* | 9/2018 | Park | H04W 76/14 |
| 2019/0124715 A1* | 4/2019 | Chen | H04W 74/0866 |
| 2019/0215719 A1 | 7/2019 | Wei et al. | |
| 2019/0289661 A1* | 9/2019 | Chen | H04W 74/0866 |
| 2019/0342895 A1 | 11/2019 | Loehr et al. | |
| 2020/0137776 A1 | 4/2020 | Lee et al. | |
| 2020/0196264 A1 | 6/2020 | Shih et al. | |
| 2020/0275485 A1* | 8/2020 | Babaei | H04W 74/006 |
| 2021/0345395 A1* | 11/2021 | Chatterjee | H04W 76/27 |
| 2022/0007385 A1* | 1/2022 | Dudda | H04W 72/23 |
| 2022/0174774 A1* | 6/2022 | Tseng | H04W 72/1263 |

FOREIGN PATENT DOCUMENTS

| | | |
|---|---|---|
| CN | 109792765 A | 5/2019 |
| JP | 2016518778 A | 6/2016 |
| WO | 2018232259 A1 | 12/2018 |
| WO | 2019161529 A1 | 8/2019 |

OTHER PUBLICATIONS

PCT/CN2020/097218 , "International Search Report and Written Opinion", PCT Application No. PCT/CN2020/097218, Mar. 1, 2021, 7 pages.
"3GPP TS 36.300 V11.7.0 (Sep. 2013)", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Sep. 19, 2013, 209 Pages.
"3GPP TS 36.321 V16.0.0", 3rd Generation Partnership Project; Technical Specification Group Radio Access Network; Evolved Universal Terrestrial Radio Access (E-UTRA); Medium Access Control (MAC) protocol specification (Release 16), Apr. 6, 2020, 141 pages.
20940841.8 , "Extended European Search Report", European Application No. 20940841.8, 16 pages.
3GPP , "Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, 1048.
Ericsson , et al., "3GPP TSG-RAN WG2 Meeting #109bis-e", "Moving UL grant handling from MAC to RRC for PUR", 3GPP Draft; R2-2003355, 3rd Generation Partnership Project (3GPP), vol. RAN WG2, No. Electronic meeting; Apr. 20, 2020-Apr. 30, 2020, Apr. 10, 2020, 16 pages.
2022578765 , "Foreign Office Action", JP Application No. 2022578765, Jun. 3, 2024, 10 pages.
2022-578765 , "Decision to Grant", JP Application No. 2022-578765, Oct. 29, 2024, 6 pages.
Hisilicon , "Key points on NR small data", 3GPP TSG RAN Meeting #86, RP-192789, Stiges, Spain [retrieved Aug. 19, 2022]. Retrieved from the internet <https://www.3gpp.org/ftp/TSG_RAN/TSG_RAN/TSGR_86/Docs/>., Dec. 2019, 4 Pages.
Huawei , et al., "Remaining issues of DL quality report", 3GPP TSG-RAN WG2 Meeting #107bis, R2-1913570, Chongqing, China, Oct. 2019, 5 pages.
Lenovo , et al., "The UP common issues for small data transmissions", 3GPP TSG-RAN WG2 Meeting #113 electronic, R2-2101136, E-meeting, Jan. 2021, 3 pages.
Nokia , et al., "Further analysis of Msg4 based MT EDT", 3GPP TSG RAN WG2 Meeting #107bis, R2-1912413, Chongqing, China, Oct. 2019, 3 pages.
"Foreign Office Action", CN Application No. 202080102185.0, Dec. 30, 2024, 9 pages.
"Foreign Office Action", CN Application No. 202080102185.0, May 9, 2025, 45 pages.
Huawei, "Report of email discussion [99bis#55][MTC/NB-IOT] EDT RRC messages", 3GPP TSG-RAN WG2 Meeting#100, R2-1713182, [Retrieved from the Internet], https://www.3gpp.org/ftp/tsg_ran/WG2_RL2/TSGR2_100/Docs/, Nov. 17, 2017, 29 pages.
NEC, "Updates to Small Data Transmission from RRC Idle Mode Solution", SA WG2 Meeting #98, S2-132472, {Retrieved from the Internet], https://www.3gpp.org/ftp/tsg_sa/WG2_Arch/TSGS2_98_Valencia/Docs/, Jul. 9, 2013, 8 pages.
Potevio, "Issues of PDCP duplication", 3GPP TSG-RAN WG2 meeting #101bis, R2-18004513, [Retrieved from the Internet], https://www.3gpp.org/ftp/tsg_ran/WG2_RL2/TSGR2_101bis/Docs, Apr. 4, 2018, 3 pages.

* cited by examiner

METHOD AND APPARATUS FOR SMALL DATA TRANSMISSION

TECHNICAL FIELD

Embodiments of the present application generally relate to wireless communication technology, especially to a method and an apparatus for small data transmission of a user equipment (UE) in an RRC_IDLE state or an RRC_INACTIVE state.

BACKGROUND

In long term evolution (LTE), in the case that a UE wants to transmit data, it may trigger an early data transmission (EDT) procedure. The EDT procedure may include an EDT procedure for control plane (CP) cellular internet of things (CIoT) evolved packet system (EPS) optimizations and an EDT procedure for user plane (UP) CIoT EPS optimizations. In the EDT procedure for CP CIoT EPS optimizations, the data may be transmitted through a radio resource control (RRC) early data request message. In the EDT procedure for UP CIoT EPS optimizations, the data may be transmitted through an RRC connection resume request message.

New radio (NR) supports an RRC_INACTIVE state. In the case that the UE wants to transmit data in the RRC_INACTIVE state, a work item in the NR states that the data may be transmitted through a random access channel (RACH)-based scheme (e.g., 2-step RACH scheme or 4-step RACH scheme) via the pre-configured physical uplink share channel (PUSCH) resources.

All of the above schemes for transmitting data in the RRC_IDLE state or in the RRC_INACTIVE state may involve a medium access control (MAC) reset operation after transmitting the data. However, the MAC reset operation may affect the fairness for the traffics in some logical channels, for example the logical channels with low priorities. In addition, for the data transmission using an EDT procedure for CP CIoT EPS optimizations, how to manage the quality of service (QoS) is another issue.

Therefore, the industry desires an improved technology for small data transmission, so as to satisfy the QoS requirement and fairness for the traffics transmitted in the logical channels in NR systems.

SUMMARY OF THE APPLICATION

Some embodiments of the present application at least provide a technical solution for small data transmission of a UE.

According to some embodiments of the present application, a method may include: maintaining a priority variable for each logical channel of at least one logical channel; determining a value of the priority variable for each logical channel after performing a first logical channel prioritization (LCP) procedure; receiving a message indicating a MAC reset; and after receiving the message, in a second LCP procedure subsequent to the first LCP procedure, using the value as an initial value of the priority variable for each logical channel of the at least one logical channel.

In an embodiment the present application, the message indicating the MAC reset may be one of: an RRC release message including a suspend configuration information element (IE); an RRC early data complete message; and a MAC reset message following small data transmission.

In another embodiment the present application, the at least one logical channel may be used for a small data transmission, and wherein the at least one logical channel may be determined based on configuration information from a base station (BS) and/or a logical channel selection procedure for an uplink (UL) grant.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for small data transmission of a UE, e.g., a UE is not in the RRC_CONNECTED state. For example, the UE may be in the RRC_IDLE state or the RRC_INACTIVE state. Accordingly, embodiments of the present application can satisfy the QoS requirement and fairness for the traffics transmitted in the logical channels in NR systems.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
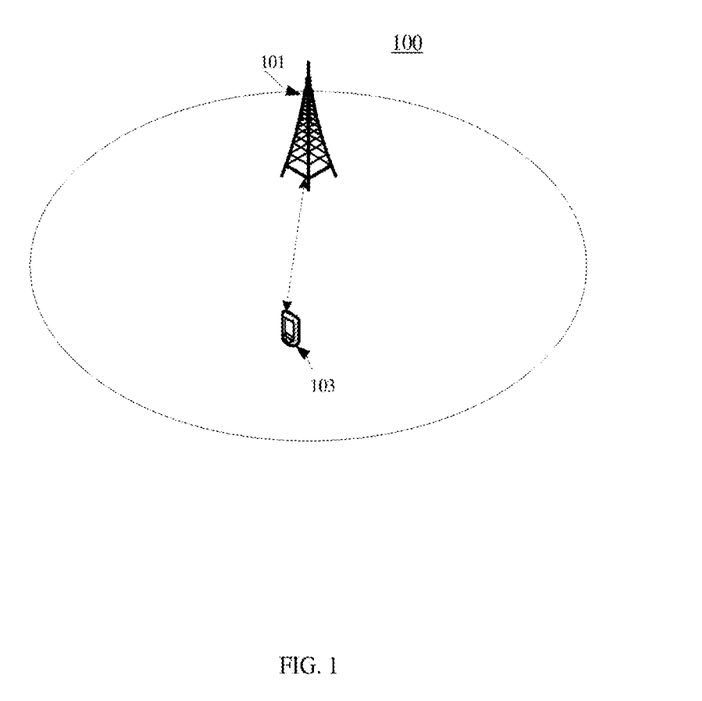
FIG. 1 is a schematic diagram illustrating an exemplary wireless communication system 100 according to some embodiments of the present application.

FIG. 1 is a schematic diagram illustrating an exemplary wireless communication system 100 according to an embodiment of the present application.

As shown in FIG. 1, the wireless communication system 100 can include at least one base station (BS) 101 and at least one UE 103. Although a specific number of BSs 101 and UEs 103, e.g., only one BS 101 and one UE 103 are depicted in FIG. 1, one skilled in the art will recognize that any number of the BSs 101 and UEs 103 may be included in the wireless communication system 100.

The BS 101 may be distributed over a geographic region, and generally be a part of a radio access network that may include one or more controllers communicably coupled to one or more corresponding BSs. In some embodiments of the present application, each BS may also be referred to as an access point, an access terminal, a base, a macro cell, a Node-B, an evolved Node B (eNB), a gNB, a Home Node-B, a relay node, a device, or described using other terminology used in the art.

The UE 103 may be a legacy UE (or regular UE) compatible with existing technology, or a normal NR UE. For example, the UE 103 may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103 may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE 103 may be a wearable device, such as a smart watch, a fitness band, an optical head-mounted display, or the like. Moreover, the UE 103 may be referred to as a subscriber unit, a mobile, a mobile station, a user, a terminal, a mobile terminal, a wireless terminal, a fixed terminal, a subscriber station, a user terminal, or a device, or described using other terminology used in the art.

The UE 103 may be a capability reduced UE, for example, a narrow band internet of things (NB-IoT) UE or an enhance machine type communication (eMTC) UE. The capability reduced UE may be an industrial wireless sensor, a video surveillance, a wearable device, or another device with the characteristics of the capability reduced UE. Compared with a legacy UE, the capability reduced may have a smaller bandwidth to enable several Kbps to several Mbps throughput; and achieve a lower power consumption to enable a longer UE battery life, cost reduction, flexible latency requirement, flexible UE processing time, and flexible UE processing capability, etc.

In long term evolution (LTE), in the case that a UE wants to transmit uplink data, it may trigger an EDT procedure.

According to some embodiments of the present application, the EDT procedure may include an EDT procedure for CP CIoT EPS optimizations. In this procedure, the uplink data may be included in a non-access stratum (NAS) message, the UE may transmit an RRC early data request message including the NAS message to the BS. In response to the RRC early data request message, the BS may transmit an RRC early data complete message. After receiving the RRC early data complete message, the UE may reset MAC and release the MAC configuration. In an embodiment of the present application, the uplink (UL) grant for transmitting the uplink data may be indicated in a random access response message. In an embodiment of the present application, the UL grant for transmitting the uplink data may be the preconfigured uplink resources (PURs).

According to some other embodiments of the present application, the EDT procedure may include an EDT procedure for UP CIoT EPS optimizations. In this procedure, the UE may transmit RRC connection resume request message including the uplink data to the BS. In response to the RRC connection resume request message, the BS may transmit an RRC connection release message including a suspend configuration IE to the UE to keep the UE in the RRC_IDLE state. After receiving the RRC connection release message, the UE may reset MAC. In an embodiment of the present application, the uplink (UL) grant for transmitting the uplink data may be indicated in a random access response message. In an embodiment of the present application, the UL grant for transmitting the uplink data may be the preconfigured uplink resources (PURs).

NR supports an RRC_INACTIVE state. Until Rel-16, the RRC_INACTIVE state doesn't support data transmission. Hence, in the case that the UE in the RRC_INACTIVE state has data to be transmitted, it has to resume the connection (i.e. move to the RRC_CONNECTED state) for any downlink and uplink data transmission. The RRC Connection setup and subsequently release to the RRC_INACTIVE state happen for each data transmission, which results in unnecessary power consumption and signaling overhead. To enable the data transmission in the RRC_INACTIVE state, a work item in the NR states that small data transmission in the RRC_INACTIVE state may be implemented through a random access channel (RACH)-based scheme (e.g., 2-step RACH scheme or 4-step RACH scheme as specified in 3GPP standard documents), without changing the RRC state of the UE to the he RRC_CONNECTED state. For example, the small data may be transmitted using MSGA in 2-step RACH scheme or MSG3 in 4-step RACH scheme. In these schemes, the small data may be transmitted via the preconfigured PUSCH resources (e.g. reusing the configured grant type 1 as specified in 3GPP standard documents). After transmitting the small data, the UE may receive a MAC reset message. If a reset of the MAC entity is requested by upper layers of the UE, the MAC entity may initialize a priority variable (e.g., Bj as specified in 3GPP standard documents) for each logical channel to zero.

The small data may include small and infrequent data traffic. Specific examples of small and infrequent data traffic include the following use cases: 1) smartphone applications; and 2) non-smartphone applications. The smartphone applications may include traffic from instant messaging services (whatsapp, QQ, wechat, etc.); heart-beat/keep-alive traffic from instant messaging (IM)/email clients and other apps; and push notifications from various applications. The non-smartphone applications may include traffic from wearables (e.g., periodic positioning information, etc.), sensors (e.g., industrial wireless sensor networks transmitting temperature, pressure readings periodically or in an event triggered manner, etc), and smart meters and smart meter networks sending periodic meter readings. Persons skilled in the art can understand that the above use cases are only for illustrative purposes, according to some other embodiments, the same data may include the data in other uses cases with same amount and infrequent transmission.

When performing an uplink data transmission, a logical channel prioritization (LCP) procedure may be applied. In the LCP procedure, the RRC controls the scheduling of uplink data by signaling for each logical channel per MAC entity: priority where an increasing priority value indicates a lower priority level; the prioritized bit rate (PBR); and the bucket size duration (BSD). The UE may maintain a priority variable (e.g., Bj) for each logical channel j. The MAC entity of the UE may initialize Bj of the logical channel to zero when the logical channel is established. For each logical channel j, the MAC entity of the UE may increment Bj by the product PBR×T before every instance of the LCP procedure, wherein T is the time elapsed since Bj was last incremented; if the increment would cause the value of Bj to exceed the bucket size (i.e. PBR×BSD), the UE may set Bj to the bucket size. Logical channels with Bj>0 are allocated resources in a decreasing priority order. After the LCP procedure, the UE may decrement Bj by the total size of MAC service data units (SDUs) served to logical channel j in the LCP procedure.

Figure 2:
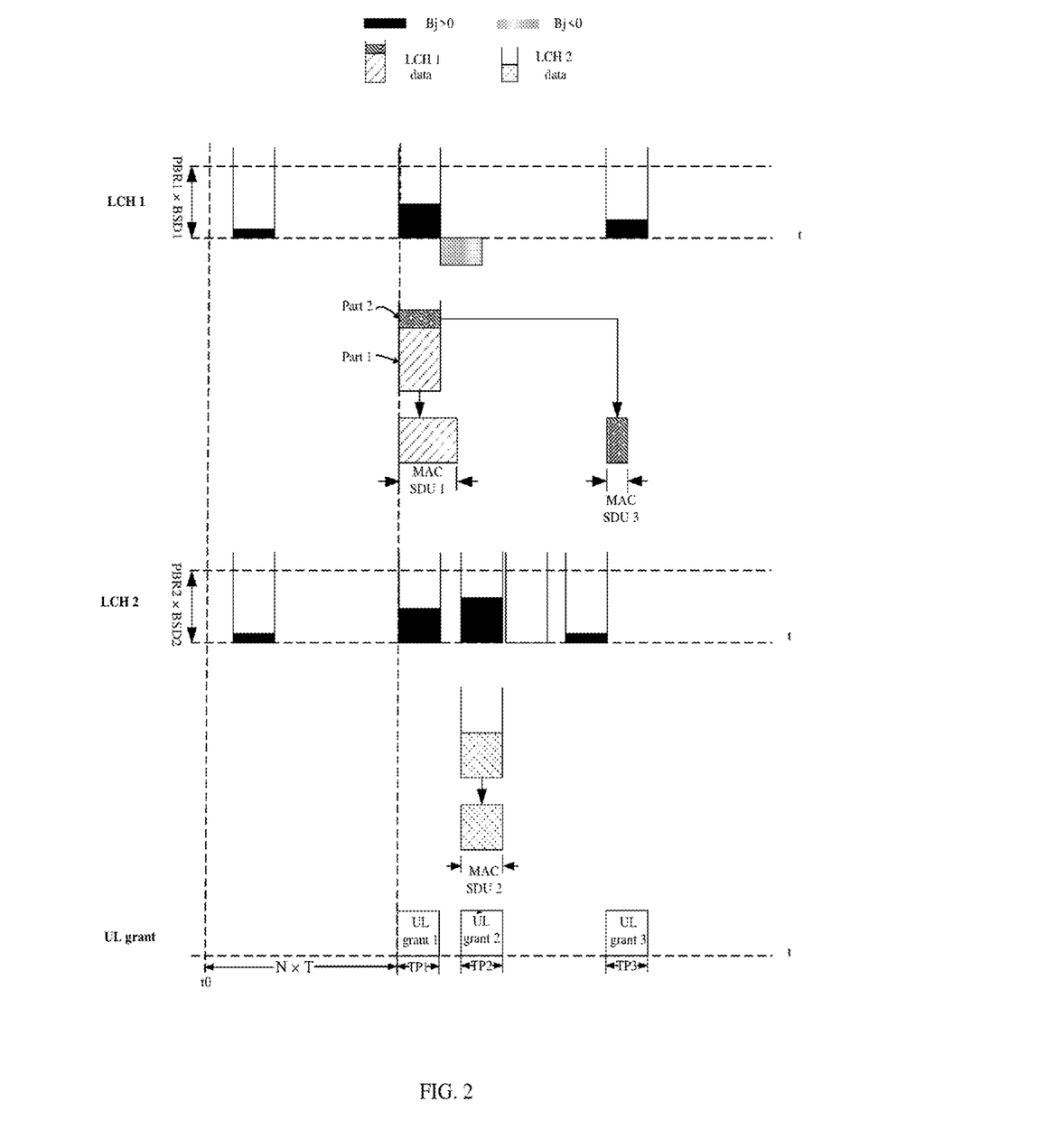
FIG. 2 illustrates a LCP procedure in NR according to some embodiments of the present application.

For example, FIG. 2 illustrates a LCP procedure in NR according to some embodiments of the present application. Referring to FIG. 2, assuming that a UE has two logical channels, for example, LCH 1 and LCH 2. The priority of LCH 1 is higher than LCH 2. The UE may maintain a priority variable (e.g., Bj) for each logical channel j. For example, the UE may maintain a priority variable B1 for the LCH 1 and maintain a priority variable B2 for the LCH 2. The bucket size of LCH 1 is PBR1×BSD1. The bucket size of LCH 2 is PBR2×BSD2.

At time t0, the MAC entity of the UE may initialize both B1 and B2 to zero. After that, the MAC entity of the UE may increment Bj by the product of PBR and T before every instance of the LCP procedure, wherein T is the time elapsed since Bj was last incremented. At a time period TP1, a UL grant 1 may be available for the UE to transmit uplink user data, and thus the UE may allocate the UL grant to the data in the logical channels with Bj>0 in a decreasing priority order.

As shown in FIG. 2, assuming that from time t0 to the time when the UL grant 1 appears, the total time elapsed is N×T, then B1 of LCH 1 may be PBR1×N×T and B2 of LCH 2 may be PBR2×N×T. Since the priority of LCH 1 is higher than LCH 2, the data in the LCH 1 should be allocated with the resource of the UL granted firstly. As shown in FIG. 2, not all the data in the LCH 1 can be transmitted in the UL grant 1, only part 1 of the data in the LCH 1 is included in a MAC SDU 1 for transmitting in the UL grant 1.

After forming the MAC SDU 1, the MAC entity of the UE may decrement B1 by the size of the MAC SDU 1 and the value of the B1 may be (PBR1×N×T)−the size of the MAC SDU 1, which is negative as shown in FIG. 2. In another aspect, the data in the LCH 2 is not transmitted, and thus the MAC entity of the UE does not perform subtraction to B2.

After that, at a time period TP2, a UL grant 2 may be available for the UE to transmit uplink user data. The UE may allocate the UL grant to the data in the logical channels with Bj>0 in a decreasing priority order. From the time when MAC SDU 1 is transmitted until the UL grant 2 appears, both B1 and B2 are incremented. However, at the time when the UL grant 2 appears, B1 is still negative, and thus the data in CH2 should be allocated with the resource of the UL granted 2. As shown in FIG. 2, all the data in the LCH 2 is included in a MAC SDU 2 for transmitting in the UL grant 2. After forming the MAC SDU 2, the MAC entity of the UE may decrement B2 by the size of the MAC SDU 2. B2 may be zero as shown in FIG. 2.

After that, at a time period TP3, a UL grant 3 may be available for the UE to transmit uplink user data. The UE may allocate the UL grant to the data in the logical channels with Bj>0 in a decreasing priority order. From the time when MAC SDU 2 is transmitted until the UL grant 3 appears, both B1 and B2 are incremented. At the time when the UL grant 2 appears, B1 is positive, and thus the data in LCH 1 should be allocated with the resource of the UL granted 3 first. As shown in FIG. 2, part 2 of the data in the LCH 1 is included in a MAC SDU 3 for transmitting in the UL grant 3. After forming the MAC SDU 3, the MAC entity of the UE may decrement B1 by the size of the MAC SDU 3. The above process is continuously executed over time. Persons skilled in the art can understand that two logical channels are only for illustrative purposes, according to some other embodiments; the UE may include one or more logical channels and the procedure are similar as stated above.

The LCP procedure in FIG. 2 ensures the fairness of data transmission in different logical channels, especially for the logical channels with low priorities. However, the LCP procedure used in the small data transmission of the UE in the RRC_IDLE state or RRC_INACTIVE state may bring some issues. For example, FIG. 3 illustrates a LDP procedure for small data transmission according to some embodiments of the present application.

Figure 3:
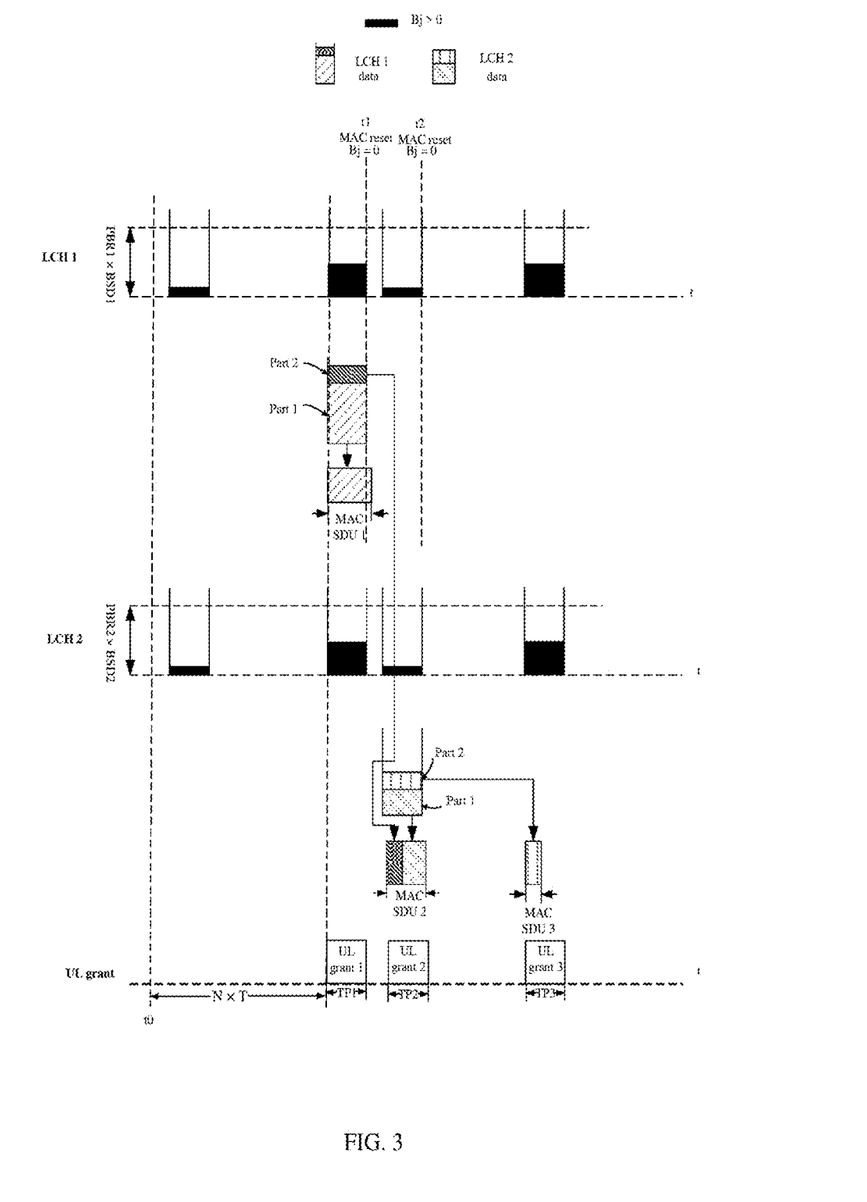
FIG. 3 illustrates a LCP procedure for small data transmission according to some embodiments of the present application.

Referring to FIG. 3, each of the UL granted 1, the UL granted 2, and UL grant 3 may be obtained based on an EDT procedure, may be obtained based on a RACH procedure, may be the configured grant type 1 resources, or may be the resources small data transmission obtained from any other procedures. For example, UL granted 1 may be obtained based on a RACH procedure, whereas UL granted 2 and UL grant 3 may be similar as or may reuse the configured grant type 1 resources specified in 3GPP standard documents. The operation before transmitting the MAC SDU 1 are the same as that illustrated in FIG. 2. The difference is that FIG. 3 involves small data transmission of the UE in the RRC_IDLE state or RRC_INACTIVE state. That is, after transmitting the MAC SDU 1 in the UL grant 1, at time t1, the UE may receive an RRC release message including a suspend configuration IE, an RRC early data complete message, or a MAC reset message following small data transmission. All of these messages may indicate resetting the MAC. Given this, although B1 is negative after transmitting the MAC SDU 1, it will be initialized to zero after receiving the message indicating resetting the MAC.

After that, at a time period TP2, a UL grant 2 may be available for the UE to transmit uplink user data. The UE may allocate the UL grant to the data in the logical channels with Bj>0 in a decreasing priority order. From the time when MAC SDU 1 is transmitted until the UL grant 2 appears, both B1 and B2 are incremented. At the time when the UL grant 2 appears, B1 is incremented to a positive value, and thus the data in LCH 1 should be firstly transmitted in the UL granted 2. As shown in FIG. 3, part 2 of the data in the LCH 1 and part 1 of the data in LCH 2 is multiplexed to a MAC PDU 2 for transmitting in the UL grant 2. The MAC PDU 2 may include MAC SDU 2 and at least one sub-header. MAC SDU 2 may include part 2 of the data in the LCH 1 and part 1 of the data in LCH 2. After forming the MAC SDU 2, the values of B1 and B2 are updated according to the size of MAC SDU which and may be positive or negative. However, both B1 and B2 may be initialized to zero after receiving the message indicating resetting the MAC in time t2.

Given the above, it can be seen from FIG. 3 that priority of the logical channel decides the sequence for assembling data in the UL grant and Bj doesn't affect anything. It is unfair to logical channels with the low priorities because the logical channels with high priorities always transmit data firstly. For example, part 2 of the data in LCH 2 which should be transmitted in UL grant 2 has to wait for the UL grant 3 for transmitting.

In addition, for the EDT procedure for CP CIoT EPS optimizations, the uplink user data may be encapsulated as NAS protocol data unit (PDU) in an uplink RRC message. The UE may transmit an RRC early data request message concatenating uplink the user data. There is no QoS related procedure in an access stratum (AS) layer. However, all the traffic in NR may have been configured with QoS parameters. Therefore, the technical solutions to satisfy the QoS in the procedure for CP optimizations are necessary.

Accordingly, embodiments of the present application can keep the fairness of data in all the logical channels when the data is transmitted as small data transmission as well as managing QoS when the uplink user data is transmitted using a CP solution (e.g., including the uplink user data in the NAS message concatenated in an RRC message). More details on embodiments of the present application will be illustrated in the following text in combination with the appended drawings.

Figure 4:
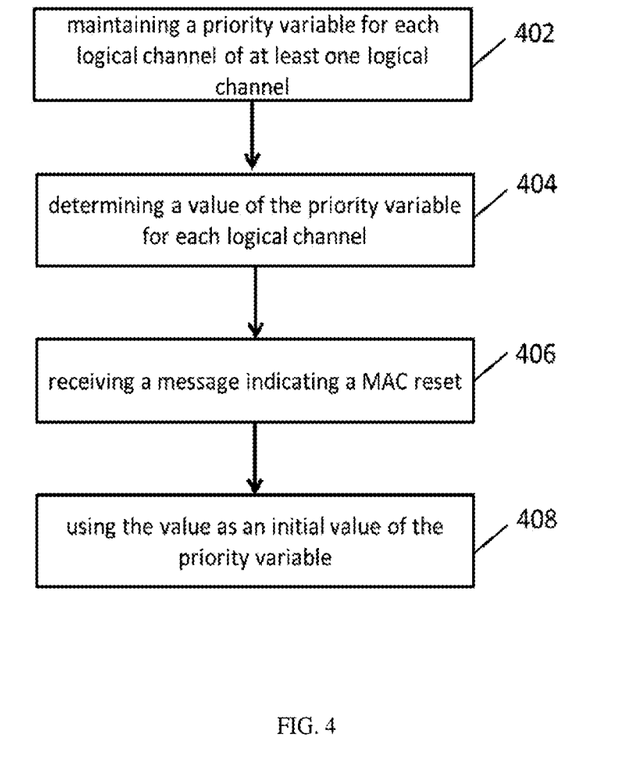
FIG. 4 is a flow chart illustrating a method for small data transmission according to some other embodiments of the present application.

FIG. 4 is a flow chart illustrating a method for small data transmission according to some embodiments of the present application. The method may be performed by a UE 103 in an RRC_IDLE state or in an RRC_INACTIVE state as shown in FIG. 1.

As shown in FIG. 4, in step 402, the UE 103 may maintain a priority variable for each logical channel of at least one logical channel. The at least one logical channel may be used for a small data transmission by the UE 103.

According to some embodiments of the present application, the at least one logical channel may be all the logical channels of the UE. In these embodiments, the UE may consider that all the logical channels can be used for the small data transmission.

According to some embodiments of the present application, the at least one logical channel may be determined based on configuration information from a BS and/or a logical channel selection procedure for an UL grant. For example, assuming that the UE has five logical channels numbered as 0, 1, 2, 3, and 4, in an embodiment of the present application, the configuration information from the BS may indicate that logical channels 0, 1, 2 can be used for the small data transmission, then the at least one logical channel may be logical channels 0, 1, 2. In another embodiment of the present application, the at least one logical channel may be logical channels 1, 2, 3 determined by a logical channel selection procedure as specified in 3GPP standard documents. In yet another embodiment of the present application, the configuration information from the BS may indicate that logical channels 1, 2, 3, 4 can be used for small data transmission, and the UE may perform a logical channel selection procedure as specified in 3GPP standard documents to select logical channels 1, 2, 3 for small data transmission. In this case, the at least one logical channels may be logical channels 1, 2, and 3 determined based on the configuration information from the BS and the logical channel selection procedure.

According to some embodiments of the present application, the small data transmission may include a UP-based small data transmission and CP-based small data transmission. The UP-based small data transmission may include transmitting the small data multiplexing with an RRC message. The CP-based small data transmission may include transmitting the small data in a NAS message concatenated in an RRC message.

According to some embodiments of the present application, the UE 103 may transmit small data through a RACH-based scheme (e.g., 2-step RACH scheme or 4-step RACH scheme as specified in 3GPP standard documents). For example, the small data may be transmitted using MSGA in 2-step RACH scheme or MSG3 in 4-step RACH scheme. In an embodiment of the present application, the BS 101 may transmit a broadcast message indicating that the network supports the small data transmission.

According to some embodiments of the present application, the UL grant for transmitting the small data may be preconfigured resources (e.g., the configured grant type 1 resources as specified in 3GPP standard documents). In an embodiment of the present application, when the network releases the UE to the RRC_INACTIVE state, the preconfigured resources may be configured with the release message for small data transmission.

According to some embodiments of the present application, the UE may support an UP-based small data transmission. In these embodiments of the present application, the priority variable maintained for each logical channel of the at least one logical channel may be Bj as specified in 3GPP standard documents. For example, assuming that the at least one logical channel used for small data transmitting is logical channel 1, 2, 3 and 4, and thus the UE may maintain B1, B2, B3, and B4 for logical channel 1, 2, 3 and 4, respectively.

The initialization procedure for Bj may be the same as those specified in 3GPP standard documents. For example, the MAC entity of the UE 103 may initialize Bj of the logical channel to zero when the logical channel is established.

For each logical channel j, the MAC entity of the UE may increment Bj by the product PBR×T before every instance of a LCP procedure to determine a first value, wherein T is the time elapsed since Bj was last incremented; if the first value is greater than the bucket size (i.e. PBR×BSD) of the logical channel j, the UE 103 may set Bj to the bucket size.

When performing a first small data transmission, a first LCP procedure may be applied. In the first LCP procedure, the MAC entity of the UE 103 may allocate resources to the at least one logical channel as follows: all the allowed logical channels with Bj>0 of the at least one logical channel are allocated resources in a decreasing priority order. Persons skilled in the art can understand that the first small data transmission may refer to the initial small data transmission after the initialization procedure or any other small data transmission after the initial small data transmission. Similarly, the first LCP procedure may refer to the initial LCP procedure after the initialization procedure or any other LCP procedure after the initial LCP procedure.

After performing the first LCP procedure, in step 404, the MAC entity of the UE 103 may determine the value of Bj for each logical channel j of the at least one logical channel. Determining the value of Bj for each logical channel j may include decrementing Bj for each logical channel by the total size of MAC SDU(s) served to logical channel j, wherein the value of the Bj before performing decrementing may be determined based on the incrementing procedure as stated above.

In step 406, the UE 103 may receive a message indicating a MAC reset. According to some embodiments of the present application, the message indicating the MAC reset may include one of: an RRC release message including a suspend configuration IE, an RRC early data complete message; and a MAC reset message following small data transmission.

In step 408, after receiving the message, in a second LCP procedure subsequent to the first LCP procedure, the UE may use the value of the Bj determined after the first LCP procedure as an initial value of the Bj for each logical channel j of the at least one logical channel. In these embodiments, step 408 may be implemented by the following procedures. For example, in response to receiving the message, the UE 103 may store the value of the Bj for each logical channel determined after the first LCP procedure as a temporary value Bj_temp for each logical channel in an RRC layer or a MAC Inver. In an embodiment of the present application, at the moment of receiving the message or when receiving the message, the UE 103 may store the value of the Bj for each logical channel as a temporary value Bj_temp for each logical channel in an RRC layer or a MAC layer. After resetting the MAC, the UE 103 may set the temporary value Bj_temp as the initial value of the Bj for each logical channel (e.g., set Bj=Bj_temp) or for the configured logical channels which are configured to allow the small data transmission, and thus the Bj may be used in a following second LCP procedure for a second small data transmission. In an embodiment of the present application, the exact moment(s) when the UE updates Bj between LCP procedures is up to UE implementation, as long as Bj is up to date at the time when a grant is processed by the LCP procedure or after MAC is reset.

According to some other embodiments of the present application, the UE may support an UP-based small data transmission. In these embodiments of the present application, the priority variable maintained for each logical channel of the at least one logical channel may be a new priority variable (e.g., Bj_smalldata) different from Bj as specified in 3GPP standard documents. The new priority variable (e.g., Bj_smalldata) is not affected by a MAC reset operation. The new priority variable may be configured or predefined for small data transmission, for example, a CP-based small data transmission and/or an UP-based small data transmission. In an embodiment of the present embodiment of the present application, the 3GPP standard documents may define that the new priority variable is used for small data transmission. In an embodiment of the present embodiment of the present application, the new priority variable may be a MAC parameter.

For example, assuming that the at least one logical channel used for small data transmitting is logical channel 1, 2, 3 and 4, and thus the UE may maintain B1_smalldata, B2_smalldata, B3_smalldata, and B4_smalldata for logical channel 1, 2, 3 and 4, respectively.

The MAC entity of the UE 103 may initialize Bj_smalldata of the logical channel to zero when UE 103 initiates a small data transmission or when UE 103 is released to INACTIVE state with the configuration of small data transmission or when the logical channel is established.

For each logical channel j, the MAC entity of the UE may increment Bj_smalldata by the product PBR×T before every instance of a LCP procedure to determine a first value, wherein T is the time elapsed since Bj_smalldata was last incremented; if the first value is greater than the bucket size (i.e. PBR×BSD) of the logical channel j, the UE 103 may set Bj_smalldata to the bucket size. In an embodiment of the present application, the exact moment(s) when the UE updates Bj_smalldata between LCP procedures is up to UE implementation, as long as Bj_smalldata is up to date at the time when a grant is processed by the LCP procedure or after MAC is reset.

When performing a first small data transmission, a first LCP procedure may be applied. In the first LCP procedure, the MAC entity of the UE 103 may allocate resources to the at least one logical channel as the following steps: step 1: all the allowed logical channels with Bj_smalldata>0 of the at least one logical channel are allocated resources in a decreasing priority order. If the PBR of a logical channel is set to infinity, the MAC entity shall allocate resources for all the data that is available for transmission on the logical channel before meeting the PBR of the lower priority logical channel(s). Persons skilled in the art can understand that the first small data transmission may refer to the initial small data transmission after the initialization procedure or any other small data transmission after the initial small data transmission. Similarly, the first LCP procedure may refer to the initial LCP procedure after the initialization procedure or any other LCP procedure after the initial LCP procedure.

Step 2: after performing the first LCP procedure, the MAC entity of the UE 103 may determine the value of Bj_smalldata for each logical channel j of the at least one logical channel (i.e., step 404 as shown in FIG. 4). Determining the value of Bj_smalldata for each logical channel j may include decrementing Bj_smalldata for each logical channel by the total size of MAC SDU(s) served to logical channel j, wherein the value of the Bj_smalldata before performing decrementing may be determined based on the incrementing procedure as stated above. The Bj_smalldata may be negative after performing the first LCP procedure.

Step 3: if any resources remain, all the logical channels of the at least one logical channels are served in a strict decreasing priority order regardless of the value of Bj_smalldata until either the data for that logical channel or the UL grant is exhausted, whichever comes first. Logical channels configured with equal priority should be served equally. According to some embodiments of the present application, step 1 and step 2 may be not performed by the UE 103.

In step 406, the UE 103 may receive a message indicating a MAC reset. According to some embodiments of the present application, the message indicating the MAC reset may include one of: an RRC release message including a suspend configuration IE, an RRC early data complete message; and a MAC reset message following small data transmission.

In step 408, after receiving the message, in a second LCP procedure subsequent to the first LCP procedure, the UE may use the value of the Bj_smalldata determined after the first LCP procedure as an initial value of the Bj_smalldata for each logical channel j of the at least one logical channel. As stated above, the Bj_smalldata is a new priority variable which is not affected by the MAC reset operation. That is, in response to receiving the message, the UE 103 may not initialize the priority variable Bj_smalldata for each logical channel j to zero, such that the value of the Bj_smalldata determined after the first LCP procedure may be used in a following second LCP procedure for a second small data transmission.

According to some embodiments of the present application, the UE may support a CP-based small data transmission. In an embodiment of the present application, according to the mapping rule of flow to DRB and DRB to logical channel, the AS layer may find the logical channel j which corresponds to the NAS flow that the NAS data is transmitted. In an embodiment of the present application, the CP-based small data transmission may be limited to some flows which configured by a mobility management entity (MME) or an access and mobility management function (AMF).

In these embodiments, the priority variable maintained for each logical channel of the at least one logical channel may be Bj as specified in 3GPP standard documents. For example, assuming that the at least one logical channel used for small data transmitting is logical channel 1, 2, 3 and 4, and thus the UE may maintain B1, B2, B3, and B4 for logical channel 1, 2, 3 and 4, respectively.

The initialization procedure for Bj may be the same as those specified in 3GPP standard documents. For example, the MAC entity of the UE 103 may initialize Bj of the logical channel to zero when the logical channel is established.

For each logical channel j, the MAC entity of the UE may increment Bj by the product PBR×T before every instance of a LCP procedure to determine a second value, wherein T is the time elapsed since Bj was last incremented; if the second value is greater than the bucket size (i.e. PBR×BSD) of the logical channel j, the UE 103 may set Bj to the bucket size.

When performing a first small data transmission, a first LCP procedure may be applied. In the CP-based small data transmission, the first small data may be included in a NAS message concatenated in an RRC message for transmitting via logical channel(s). In the first LCP procedure, the MAC entity of the UE 103 may allocate resources to the logical channel(s) for small data transmission. Persons skilled in the art can understand that the first small data transmission may refer to the initial small data transmission after the initialization procedure or any other small data transmission after the initial small data transmission. Similarly, the first LCP procedure may refer to the initial LCP procedure after the initialization procedure or any other LCP procedure after the initial LCP procedure.

After performing the first LCP procedure, in step 404, the MAC entity of the UE 103 may determine the value of Bj for each logical channel j of the at least one logical channel. Before determining the value of Bj, a lower layer of the UE 103 may retrieve a size of the data transmitted by a higher layer served to each logical channel from a higher layer. In an embodiment of the present application, the lower layer may be an AS layer. The AS layer may include one of more of the followings: an RRC layer, a MAC layer, a packet data convergence protocol (PDCP), radio link control (RLC) layer, and a physical (PHY) layer. In an embodiment of the present application, the higher layer may be a NAS layer.

After that, the UE 103 may determine a total size of MAC SDU served to each logical channel based on at least one of followings: the size the data transmitted by the higher layer for the logical channel, a size of a PDCP header, a size of an RLC header, and a size of a service data adaption protocol (SDAP) header. For example, in the case that the SDAP layer is configured for the UE, a total size of MAC SDU served to each logical channel equals a sum of the size the data transmitted by the higher layer, the size of the PDCP header, the size of the RLC header, and the size of a SDAP header. Then, the UE may determine the value of the priority variable Bj based on the total size of MAC SDU served to each logical channel. For example, determining the value of Bj for each logical channel j may include decrementing Bj for each logical channel by the total size of MAC SDU(s) served to logical channel j, wherein the value of the Bj before performing decrementing may be determined based on the incrementing procedure as stated above.

In an embodiment of the present application, in response to that the value of the priority variable Bj is negative, the lower layer of the UE 103 may transmit a first indication to the higher layer to suspend small data transmission. After some time instances, the UE 103 may transmit a second indication to the higher layer to allow small data transmission when the Bj>0.

In another embodiment of the present application, in response to that the value of the priority variable Bj is positive, the lower layer of the UE 103 may transmit a second indication to the higher layer to allow small data transmission.

In step 406, the UE 103 may receive a message indicating a MAC reset. According to some embodiments of the present application, the message indicating the MAC reset may be one of: an RRC release message including a suspend configuration IE, an RRC early data complete message; and a MAC reset message following small data transmission.

In step 408, after receiving the message, in a second LCP procedure subsequent to the first LCP procedure, the UE may use the value of the Bj determined after the first LCP procedure as an initial value of the Bj for each logical channel j of the at least one logical channel. In these embodiments, step 408 may be implemented by the following procedures. For example, in response to receiving the message, the UE 103 may store the value of the Bj for each logical channel determined after the first LCP procedure as a temporary value Bj_temp for each logical channel in an RRC layer or a MAC layer. After resetting the MAC, the UE 103 may set the temporary value Bj_temp as the initial value of the Bj for each logical channel (e.g., set Bj=Bj_temp), and thus the Bj may be used in a following second LCP procedure for a second small data transmission.

According to some other embodiments of the present application, the UE may support a CP-based small data transmission. In an embodiment of the present application, according to the mapping rule of flow to logical channel, the AS layer may find the logical channel j which corresponds to the NAS flow that the NAS data is transmitted. In an embodiment of the present application, the CP-based small data transmission may be limited to some flows which configured by a mobility management entity (MME) or an access and mobility management function (AMF).

In these embodiments of the present application, the priority variable maintained for each logical channel of the at least one logical channel may be a new priority variable (e.g., Bj_smalldata) different from Bj as specified in 3GPP standard documents. The new priority variable (e.g., Bj_smalldata) is not affected by a MAC reset operation. The new priority variable may be configured or predefined for small data transmission, for example, a CP-based small data transmission and/or an UP-based small data transmission. In an embodiment of the present embodiment of the present application, the 3GPP standard documents may define that the new priority variable is used for small data transmission. In an embodiment of the present embodiment of the present application, the new priority variable may be a MAC parameter.

For example, assuming that the at least one logical channel used for small data transmitting is logical channel 1, 2, 3 and 4, and thus the UE may maintain B1_smalldata, B2_smalldata, B3_smalldata, and B4_smalldata for logical channel 1, 2, 3 and 4, respectively.

The MAC entity of the UE 103 may initialize Bj_smalldata of the logical channel to zero when UE 103 initiates a small data transmission or when UE 103 is released to INACTIVE state with the configuration of small data transmission or when the logical channel is established.

For each logical channel j, the MAC entity of the UE may increment Bj_smalldata by the product PBR×T before every instance of a LCP procedure to determine a second value, wherein T is the time elapsed since Bj_smalldata was last incremented; if the second value is greater than the bucket size (i.e. PBR×BSD) of the logical channel j, the UE 103 may set Bj_smalldata to the bucket size. In an embodiment of the present application, the exact moment(s) when the UE updates Bj_smalldata between LCP procedures is up to UE implementation, as long as Bj_smalldata is up to date at the time when a grant is processed by the LCP procedure or after MAC is reset.

When performing a first small data transmission, a first LCP procedure may be applied. In the CP-based small data transmission, the first small data may be included in a NAS message concatenated in an RRC message for transmitting via logical channel(s). In the first LCP procedure, the MAC entity of the UE 103 may allocate resources to the logical channel(s) for small data transmission. Persons skilled in the art can understand that the first small data transmission may refer to the initial small data transmission after the initialization procedure or any other small data transmission after the initial small data transmission. Similarly, the first LCP procedure may refer to the initial LCP procedure after the initialization procedure or any other LCP procedure after the initial LCP procedure.

After performing the first LCP procedure, in step 404, the MAC entity of the UE 103 may determine the value of $Bj\_smalldata$ for each logical channel j of the at least one logical channel. Before determining the value of $Bj\_smalldata$, a lower layer of the UE 103 may retrieve a size of the data transmitted by a higher layer served to each logical channel from a higher layer. In an embodiment of the present application, the lower layer may be an AS layer. The AS layer may include one of more of the followings: an RRC layer, a MAC layer, a PDCP, an RLC layer, and a PHY layer. In an embodiment of the present application, the higher layer may be a NAS layer.

After that, the UE 103 may determine a total size of MAC SDU served to each logical channel based on at least one of followings: the size the data transmitted by the higher layer for the logical channel, a size of a PDCP header, a size of an RLC header, and a size of a SDAP header. For example, in the case that the SDAP layer is configured for the UE, a total size of MAC SDU served to each logical channel equals a sum of the size the data transmitted by the higher layer, the size of the PDCP header, the size of the RLC header, and the size of a SDAP header. Then, the UE may determine the value of the priority variable $Bj\_smalldata$ based on the total size of MAC SDU served to each logical channel. For example, determining the value of $Bj\_smalldata$ for each logical channel j may include decrementing $Bj\_smalldata$ for each logical channel by the total size of MAC SDU(s) served to logical channel j, wherein the value of the $Bj\_smalldata$ before performing decrementing may be determined based on the incrementing procedure as stated above.

In an embodiment of the present application, in response to that the value of the priority variable $Bj\_smalldata$ is negative, the lower layer of the UE 103 may transmit a first indication to the higher layer to suspend small data transmission. After some time instances, the UE 103 may transmit a second indication to the higher layer to allow small data transmission when the $Bj\_smalldata>0$.

In another embodiment of the present application, in response to that the value of the priority variable $Bj\_smalldata$ is positive, the lower layer of the UE 103 may transmit a second indication to the higher layer to allow small data transmission.

If any resources remain, all the logical channels of the at least one logical channels are served in a strict decreasing priority order regardless of the value of $Bj\_smalldata$ until either the data for that logical channel or the UL grant is exhausted, whichever comes first. Logical channels configured with equal priority should be served equally.

In step 406, the UE 103 may receive a message indicating a MAC reset. According to some embodiments of the present application, the message indicating the MAC reset may be one of: an RRC release message including a suspend configuration IE, an RRC early data complete message; and a MAC reset message following small data transmission.

In step 408, after receiving the message, in a second LCP procedure subsequent to the first LCP procedure, the UE may use the value of the $Bj\_smalldata$ determined after the first LCP procedure as an initial value of the $Bj\_smalldata$ for each logical channel j of the at least one logical channel. As stated above, the $Bj\_smalldata$ is a new priority variable which is not affected by the MAC reset operation. That is, in response to receiving the message, the UE 103 may not initialize the priority variable $Bj\_smalldata$ for each logical channel j to zero, such that the value of the $Bj\_smalldata$ determined after the first LCP procedure may be used in a following second LCP procedure for a second small data transmission.

Figure 5:
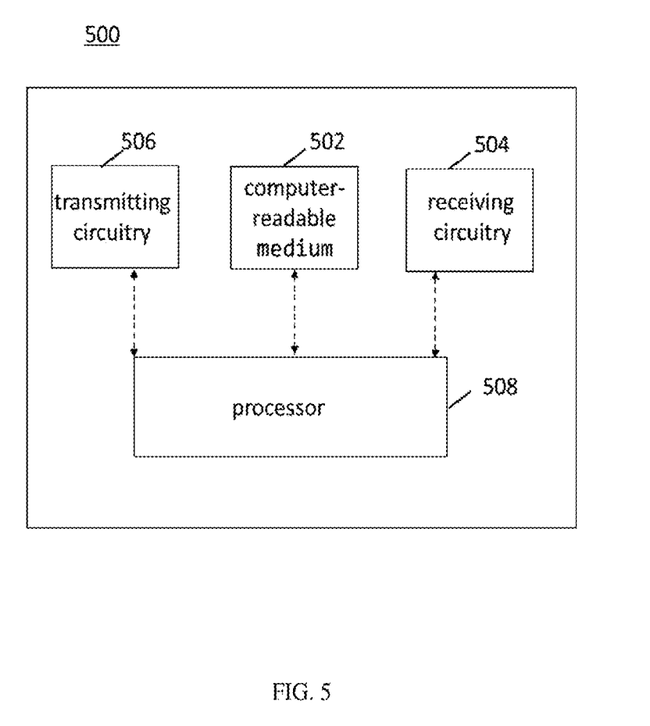
FIG. 5 illustrates a simplified block diagram of an apparatus 500 for small data transmission according to some embodiments of the present application.

FIG. 5 illustrates a simplified block diagram of an apparatus 500 for small data transmission according to some embodiments of the present application. The apparatus 500 may be a UE 103 as shown in FIG. 1.

Referring to FIG. 5, the apparatus 500 may include at least one non-transitory computer-readable medium 502, at least one receiving circuitry 504, at least one transmitting circuitry 506, and at least one processor 508. In some embodiment of the present application, at least one receiving circuitry 504 and at least one transmitting circuitry 506 and be integrated into at least one transceiver. The at least one non-transitory computer-readable medium 502 may have computer executable instructions stored therein. The at least one processor 508 may be coupled to the at least one non-transitory computer-readable medium 502, the at least one receiving circuitry 504 and the at least one transmitting circuitry 506. The computer executable instructions can be programmed to implement a method with the at least one receiving circuitry 504, the at least one transmitting circuitry 506 and the at least one processor 508. The method can be a method according to an embodiment of the present application, for example, the method shown in FIG. 4.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communication, comprising:
    at least one memory; and
    at least one processor coupled with the at least one memory and configured to cause the UE to:
    determine, while the UE is in at least one of a radio resource control idle (RRC_IDLE) state or a radio resource control inactive (RRC_INACTIVE) state, whether to perform a small data transmission;
    apply an initial logical channel prioritization (LCP) procedure for the small data transmission on one or more uplink (UL) grant resources;
    receive a message indicating a medium access control (MAC) reset; and
    use a pre-defined value as an initial value of priority variable for logical channels.

2. The UE of claim 1, wherein the at least one processor is configured to cause the UE to apply one or more other LCP procedures for the small data transmission.

3. The UE of claim 1, wherein the at least one processor is configured to cause the UE to apply the initial LCP procedure for the small data transmission on the one or more UL grant resources according to an initial value of priority variable for logical channels which are configured for the small data transmission.

4. The UE of claim 1, wherein the at least one processor is configured to cause the UE to obtain the one or more UL grant resources through a random access channel (RACH)-based scheme.

5. The UE of claim 1, wherein the one or more UL grant resources comprise preconfigured resources.

6. The UE of claim 1, wherein the at least one processor is configured to cause the UE to one or more of:
    transmit the small data transmission including to multiplex the small data transmission with a radio resource control (RRC) message; or
    transmit the small data transmission via a Non-Access Stratum (NAS) message concatenated in an RRC message.

7. The UE of claim 1, wherein the message indicating the MAC reset comprises at least one of:
    a radio resource control (RRC) release message including a suspend configuration information element (IE);
    an RRC early data complete message; or
    a MAC reset message following the small data transmission.

8. The UE of claim 1, wherein the logical channels are configured for the small data transmission.

9. A method performed by a user equipment (UE), the method comprising:
    determining, while a user equipment (UE) is in at least one of a radio resource control idle (RRC_IDLE) state or a radio resource control inactive (RRC_INACTIVE) state, whether to perform a small data transmission;
    applying an initial logical channel prioritization (LCP) procedure for the small data transmission on one or more uplink (UL) grant resources;
    receiving a message indicating a medium access control (MAC) reset; and
    using a pre-defined value as an initial value of priority variable for logical channels.

10. The method of claim 9, further comprising applying one or more other LCP for the small data transmission.

11. The method of claim 9, further comprising applying the initial LCP procedure for the small data transmission on the one or more UL grant resources according to an initial value of priority variable for logical channels which are configured for the small data transmission.

12. The method of claim 9, further comprising obtaining the one or more UL grant resources through a random access channel (RACH)-based scheme.

13. The method of claim 9, wherein the one or more UL grant resources comprise preconfigured resources.

14. The method of claim 9, further comprising one or more of:
    transmitting the small data transmission including to multiplex the small data transmission with a radio resource control (RRC) message; or
    transmitting the small data transmission via a Non-Access Stratum (NAS) message concatenated in an RRC message.

15. The method of claim 9, wherein the message indicating the MAC reset comprises at least one of:
    a radio resource control (RRC) release message including a suspend configuration information element (IE);
    an RRC early data complete message; or
    a MAC reset message following the small data transmission.

16. The method of claim 9, wherein the logical channels are configured for the small data transmission.

17. An apparatus comprising:
    at least one memory having executable instructions stored therein;
    at least one processor coupled with the at least one memory, wherein the executable instructions are programmed to:
    determine, while the apparatus is in at least one of a radio resource control idle (RRC_IDLE) state or a radio resource control inactive (RRC_INACTIVE) state, whether to perform a small data transmission;
    apply an initial logical channel prioritization (LCP) procedure for the small data transmission on one or more uplink (UL) grant resources;
    receive a message indicating a medium access control (MAC) reset; and
    use a pre-defined value as an initial value of priority variable for logical channels.

18. The apparatus of claim 17, wherein the at least one processor is configured to cause the apparatus to apply one or more other LCP procedures for the small data transmission.

19. The apparatus of claim 17, wherein the at least one processor is configured to cause the apparatus to obtain the one or more UL grant resources through a random access channel (RACH)-based scheme.

20. The apparatus of claim 17, wherein the one or more UL grant resources comprise preconfigured resources.

* * * * *